(12) United States Patent
Rueda Sanchez

(10) Patent No.: US 6,734,261 B2
(45) Date of Patent: May 11, 2004

(54) ADDITIVES MADE FROM POLYMERIC SURFACTANTS FOR WATER-BASED ADHESIVES

(75) Inventor: Juan Carlos Rueda Sanchez, Lima (PE)

(73) Assignee: Pontificia Universidad Catolica del Peru (PE)

( * ) Notice: Subject to any disclaimer, the term of this patent is extended or adjusted under 35 U.S.C. 154(b) by 19 days.

(21) Appl. No.: 10/000,885

(22) Filed: Nov. 2, 2001

(65) Prior Publication Data

US 2003/0134974 A1 Jul. 17, 2003

(51) Int. Cl.$^7$ .................. C08F 220/54; C08F 20/70
(52) U.S. Cl. .................. 525/412; 525/63; 526/297; 526/298; 526/304; 526/306; 526/307.7
(58) Field of Search .................. 525/412, 63, 911; 526/297, 298, 304, 306, 307.7, 312

(56) References Cited

U.S. PATENT DOCUMENTS 5,153,273 A * 10/1992 Kobayashi .................. 525/412
6,458,906 B1 * 10/2002 Torgerson et al. .......... 526/240

* cited by examiner

*Primary Examiner*—James J. Seidleck
*Assistant Examiner*—Olga Asinovsky
(74) *Attorney, Agent, or Firm*—Pendorf & Cutliff

(57) ABSTRACT

An adhesion promoter for a water-based adhesive, said adhesion promoter having the general formula:

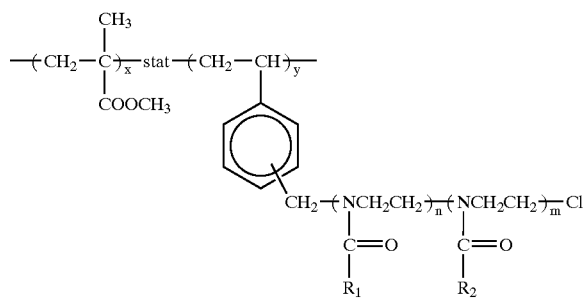

where:
x = 1–10
y = 1–10
n = 10–100
m = 0–50
R1 = methyl, ethyl
R2 = octyl, nonyl, decyl, undecyl.

10 Claims, No Drawings

ADDITIVES MADE FROM POLYMERIC SURFACTANTS FOR WATER-BASED ADHESIVES

BACKGROUND OF THE INVENTION

1. Field of the Invention

This invention relates to the synthesis of nonionic polymeric surfactants and their use as adhesion promoter additives in water-based adhesives.

2. Description of the Related Art

Adhesives are conventionally classified into two different types, i.e., (a) solvent-based in which the solid components are dispersed in an organic liquid, and (b) water-based in which the solid components exist as a solid phase dispersed in an aqueous phase. These two different types of adhesives are created by different methods of production.

Solvent-based adhesives can present environmental and safety problems because they contain volatile organic compounds. Volatile organic compounds can cause various problems such as adverse effects on a human organism, safety or hygiene problems inclusive of explosion, fire hazard, etc., and pollution problems inclusive of air pollution.

Further, the use of solvent-based adhesives requires the use of expensive solvent recovery equipment to control emissions of volatile organic compound into the work place or outside environment. For economical and ecological reasons, the industry is trying to replace solvent-based adhesives with water-based adhesive; but, unfortunately, water-based adhesives fail to provide adequate adhesive strength as found in solvent-based adhesives.

The prior art presents several methods of increasing the adhesion of a water-based adhesive.

In conventional processes that use water-based adhesives to bond materials, the materials and adhesive are exposed to heat in order to cause or speed up drying, curing, or setting of the adhesive. A problem with this type of method is that the levels of heat required are typically unsuitable for some materials.

Further, the prior art shows the use of a resin, such as an aqueous solution of a water-soluble polymer, which has been obtained by dispersing a water-dispersible polymer in water, to produce a water-based adhesive. However, in many cases, such a water-based system only using the above water-based resin cannot provide the properties that are required for the adhesives.

The prior art also shows the use of a crosslinking agent in combination with the water-based adhesive for the purpose of improving the adhesion property.

As an example of using a crosslinking agent, there is a system known using a curing agent (or hardening agent) having a free isocyanate group, in combination with a water-based adhesive. However, the system has the limitation that it only has a short work life after mixing the curing agent with the polymer component, and, therefore, this system has a problem in view of the workability or usability thereof.

Recently, the prior art is showing the use of water-based dispersions of either hydroxylated polyurethanes or polyester-urethanes with relatively high molecular weights to produce water-based adhesives. These adhesives offer a stability against oils and greases as well as adhesive strength on the substrates as is required in the shoemaking and furniture industries. However, unfortunately, these types of adhesives do not reach the adhesive strength obtained with solvent-based adhesives.

Adhesive strength is a property very important when working with substrates that are difficult to adhere, such as when attempting to glue elastomeric materials made of poly(ethylene-vinyl acetate) (EVA).

Therefore, it can be appreciated that there exists a continuing need for modifying water-based adhesives to promote the adhesion properties in order to meet the needs of the industry.

SUMMARY OF THE INVENTION

A principal object of the invention is the production of a nonionic polymeric surfactant that can be used as an additive in water-based adhesives to increase the adhesion strength.

It is yet another object of the invention to provide a method of producing a nonionic polymeric surfactant that can be used as an additive in water-based adhesives to increase the adhesion strength.

It is yet another object of the present invention to produce an additive for water-based adhesive compositions that can be used for manufacturing footwear or furniture.

In view of the foregoing disadvantages inherent in the known types of water-based adhesives in the prior art, the present inventor discovered a unique additive for a water-based adhesive that will improve the compatibility between the water-based adhesive and the substrate causing in this way a considerable increase in the adhesive strength between the glued surfaces.

Unexpectedly, inventors have discovered a new class of nonionic polymeric surfactants which are particulary useful for promoting the strength of water-based adhesives. Their use in this regard and the method of preparing the instant nonionic polymeric surfactants are also novel.

The present inventor succeeded in synthesizing a novel macroinitiator and synthesizing a novel graft polymer by using such a macroinitiator. The polymeric surfactant, a grafted copolymer, contains aromatic groups in the main chain and acetylethylenimines in the side chains.

Two reactions were required in order to prepare the nonionic polymeric surfactant of the present invention:

1) synthesis of the macroinitiator (MI) through a free-radical polymerization between a monomer and a comonomer.

The free-radical polymerization was initiated by a radical polymerization initiator under nitrogen atmosphere and at a controlled temperature. This reaction formed a linear copolymer called the macroinitiator.

2) grafting a 2-substitute-2-oxazoline with the macroinitiator in the presence of phenyl cyanide under nitrogen atmosphere and a controlled temperature. The reaction was followed by the addition of a solvent and the precipitation of the mixture in diethyl ether. The product obtained was further purified by using a solvent/non-solvent system, followed by vacuum drying until constant weight.

The adhesion promoter of the present invention had the general formula:

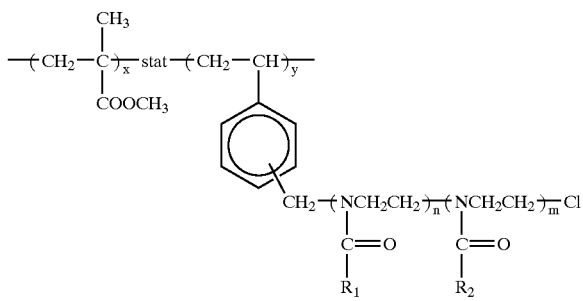

Where:
x = 1–10
y = 1–10
n = 10–100
m = 0–50
R1 = methyl, ethyl
R2 = octyl, nonyl, decyl, undecyl.

The adhesion promoter included a hydrophobic main chain and hydrophilic side chains. The side chains included at least one poly(2-methyl-2-oxazoline) and poly(2-undecyl-2-oxazoline).

The present invention also concerned a method of preparing the adhesion promotor described above, wherein the method comprised the steps of:

a) preparing a macroinitiator;
b) grafting a 2-substitute-2-oxazoline in the presence of phenyl cyanide with the macroinitiator to produce a mixture, followed by heating the mixture under nitrogen atmosphere, and precipitating the mixture in diethylether to form the polymeric surfactant; and
c) adding the polymeric surfactant to a water-based adhesive to promote adhesion;

wherein the macroinitiator was prepared by a free-radical polymerization between a chloromethylstyrene and methyl methacrylate between 20 to 100° C. under nitrogen atmosphere.

Applicants unexpectively found that the above-described polymeric surfactant caused a high increase in the adhesion strength when it was used as additives in water-based adhesives.

The foregoing outlined rather broadly the more pertinent and important features of the present invention in order that the detailed description of the invention that followed may be better understood, and so that the present contribution to the art was more fully appreciated. Additional features of the invention that were described hereinafter form the subject matter of the claims of the invention. It should be appreciated by those skilled in the art that the conception and the specific embodiments disclosed were readily utilized as a basis for synthetizing other grafted copolymers for carrying the same purposes of the present invention. It was also realized by those skilled in the art that such equivalent grafted copolymers did not depart from the spirit and scope of the invention as set forth in the appended claims.

DETAILED DESCRIPTION OF THE INVENTION

Before describing the present invention in detail, it is to be understood that this invention is not limited to the particular monomer structures, polymeric materials, processing conditions, or the like, as such may vary. It is also understood that the terminology used herein is for the purpose of describing particular embodiments only, and is not intended to be limiting.

Many adhesives preferably had a balance of one or more properties such as tackiness at the temperature of use, adhesion, cohesion (shear resistance), elongation, elasticity, color clarity and color stability, and resistance to sunlight and other ultraviolet and degrading radiation sources. Maintaining the requisite balance of such properties, while improving one or more characteristics of such adhesive, was both difficult and unpredictable. Any modification of adhesive compositions, which improved one adhesive property, may detrimentally affect one or more other desirable properties.

The present inventor discovered that polymeric surfactants, grafted copolymers, containing aromatic groups in the main chain and acetylethylenimines in the side chains, could be added to an adhesive to increase the adhesion strength without detrimentally affecting one or more other desirable properties.

Two reactions were required in order to prepare the nonionic polymeric surfactant of the present invention:

1) synthesis of the macroinitiator (MI) through a free-radical polymerization between a monomer and a comonomer. The free-radical polymerization was initiated by a radical polymerization initiator under nitrogen atmosphere and at a controlled temperature. This reaction formed a linear copolymer called the macroinitiator.

2) grafting a 2-substitute-2-oxazoline with the macroinitiator in the presence of phenyl cyanide under nitrogen atmosphere and a controlled temperature. The reaction was followed by the addition of a solvent and the precipitation of the mixture in diethyl ether. The product obtained was further purified by using a solvent system, followed by vacuum drying until constant weight.

Macroinitiator

Typical alkyl methacrylates that could be used as monomers have 1–8 carbon atoms in the alkyl group and are, for example, methyl methacrylate, ethyl methacrylate, propyl methacrylate, isopropyl methacrylate, butyl methacrylate, pentyl methacrylate, hexyl methacrylate, 2-ethyl hexyl methacrylate, other monomers are acrylonitrile, methacrylonitrile, ethylenically unsaturated monoolefins such as ethylene, propylene and butylene; diolefin such as butadiene, isoprene, vinyl esters such as vinyl acetate and vinyl propionate; vinyl ethers such as methyl vinyl ether and ethyl vinyl ether; vinyl ketones such as vinyl methyl ketone and methyl isopropenyl ketone, pentafluoropropyl methacrylate, pentafluoropropyl acrylate, styrene and derivatives; preferably methyl methacrylate.

As the comonomer copolymerizable with the monomer described above upon preparing the macroinitiator, there could be used together bromomethylstyrene, Iodomethylstyrene, chloromethylstyrene (mixture of meta- and para-isomers in a 70:30 molar ratio) and derivatives preferably, chloromethylstyrene.

Further, the polymerization initiator for use in the polymerization included, for example, known radical polymerization initiators, for example, a usual radical generator such as 2,2-azobisisobutyronitrile, benzoyl peroxide, di-tertiarybutyl peroxide, di-cumylperoxide, tertiaryamyl peroxide, cumenehydroperoxide, di(n-propyl) peroxydicarbonate, peresters such as amyl peroxyacetate and the like; a redox type radical generator such as hydrogen peroxide-iron compound, preferably, benzoyl peroxide.

Although there were no particular restrictions to the polymerization temperature for conducting such polymerization, it was appropriate to conduct the bulk radical polymerization usually at a temperature from 20 to 120° C., preferably from 50 to 100° C., most preferable 80° C.

The most adecuated solvent/non-solvent system for purification of macroinitiator is ethyl acetate/methanol or chloroform/methanol.

EXAMPLE 1

Synthesis of Macroinitiator (MI)

The synthesis was carried out by means of the mass polymerization of 5.0 g. of chloromethylstyrene (mixture of meta and para isomers in a 70:30 molar ratio) and 2.8 g. of methyl methacrylate at a temperature of 80° C.

The polymerization was initiated by 0.15 g. of benzoyl peroxide under nitrogen atmosphere for 1 hour.

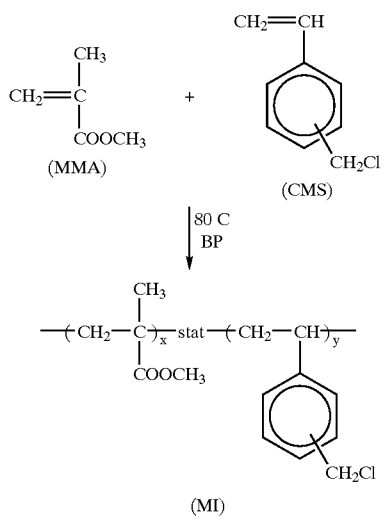

The polymerization reaction formed a linear copolymer of chloromethylstyrene and methyl methacrylate called the macroinitiator.

The chloromethylstyrene reactivity was relatively higher than the methyl metacrylate reactivity because the content of chloromethylstyrene in the copolymer was higher than the initial monomer feed, thereby, its content in the formed copolymer was higher. The percent of each reactant in the macroiniator is chloromethylstyrene 61.1% molar (or 70% by weight) and methyl methacrylate 39.9% molar (or 30% by weight).

After the polymerization as described above, the product was purified by precipitation 3 times using a solvent/non-solvent system with 50 ml of ethyl acetate as solvent and 1 lt. of methanol as non-solvent.

Typical solvents that could be used to purify the macroinitiator were chloroform, dichloromethane, tetrahydrofurane, ethyl acetate, methanol, ethanol, isopropanol.

Polymerization was continued usually at the temperature 80° C. of the reaction mixture until a statistic copolymer was formed of the desired molecular weight (20000 bis 80000. The yield was 80% approximately.

In order to estimate the content of the benzyl chloride initiating groups in the copolymer, was used the content of chlorine obtained by elemental analysis. This step is important because the functional groups benzyl chloride are the initiating groups of 2-methyl or 2-nonyl-2-oxazoline in the grafting reaction. The benzyl chloride functional groups must be present in the macroinitiator.

The following table shows the experimental details and results obtained:

TABLE I

MASS COPOLYMERIZATION OF METHYL METHACRYLATE AND CHLOROMETHYLSTYRENE
AT 80° C. reaction time: 1 hour

| CMS (g) | MMA (g) | BP (g) | Yield (g) | Mn (g/mol) | Mw/Mn | ar-CH$_2$Cl (mmol/g) |
|---|---|---|---|---|---|---|
| 5 | 2.8 | 0.15 | 6.24 | 50,960 | 2.5 | 4.53 | wherein:
CMS: chloromethylstyrene
MMA: methyl methacrylate
BP: benzoyl peroxide
Mn: number-average molecular weight of copolymer
Mw/Mn: molecular weight distribution Surfactant Polymer—Grafting a 2-substitute-2-oxazoline Grafting a 2-substitute-2-oxazoline with the macroinitiator in the presence of phenyl cyanide under nitrogen atmosphere and a controlled temperature will produce the non-ionic surfactant of the present invention.

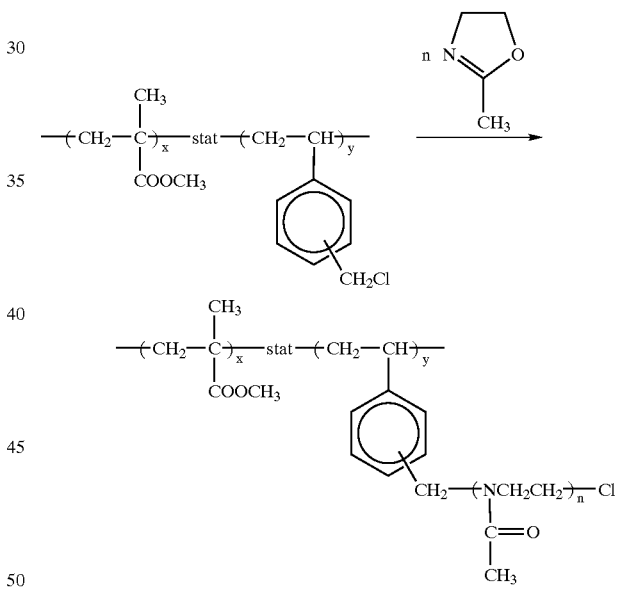

The combination of hydrophobic and hydrophilic parts in the same polymeric molecule gave the graft copolymer the surfactant character. The graft copolymer of the present invention is an amphiphilic polymer that reduces the superficial tension of water in a water solution and also shows foam formation.

The polymerization of 2-substitute-2-oxazoline was initiated by the benzyl chloride functional groups contained in the macroinitiator. The polymeric surfactants (PS) obtained included a hydrophobic main chain (aromatic groups, methyl methacrylate) and hydrophilic chains [poly(2-substitute(methyl or ethyl)-2-oxazoline] which can eventually contain a hydrophobic chain end.

The main chain could contain the following molar ratios between its components: $x=1-10$ methyl methacrylate; $y=1-10$ chloromethylstyrene, and the side chains could contain n=10–100 2-methyl-2-oxazoline. Depending on the circumstances, m=0–50 2-undecyl-2-oxazoline.

The graft copolymer contains about 3.5% by weight of polymeric backbone and correspondingly about 96.5% by weight of sidechains. The graft copolymer has a theoretic weight average molecular weight of about 995000 and preferably about 700000.

EXAMPLE 2

Grafting the 2-substitute-2-oxazoline

In a tubular glass polymerization reactor under a nitrogen atmosphere, 3 ml of 2-methyl-2-oxazoline and 0.10 g of the macroinitiator were added to 10 ml phenyl yanide, thoroughly mixed and then reacted at 110° C. for 48 hours.

Then, 30 ml of methanol was added to the reacting mixture to obtain a polymer, and after the reaction was over, the formed polymer was precipitated in 500 ml of diethyl-ether. The grafted polymer obtained in this way was purified by using the solvent/non-solvent system: 50 ml of chloroform/500 ml of diethyl ether system, followed by vacuum drying until constant weight. The reaction efficiency was 85%.

Depending on the circumstances, the reaction could be carried out in the presence of the potassium iodide catalyzer, the reaction time being reduced to 4 hours only. In case the 2-undecyl-2-oxazoline is polymerized too, this substance was added under nitrogen atmosphere after the first 48 hours of reaction and was left to polimerize for 24 additional hours at 130° C.

TABLE II

SYNTHESIS OF THE POLIMERIC SURFACTANT
AT 110° C. reaction time: 48 hours

| PS | MI (g) | MeOXA (g) | BN (ml) | Yield (g) | % N |
|---|---|---|---|---|---|
| PS1 | 0.10 | 3.0 | 10.0 | 2.60 | 15.8 |
| PS2 | 0.10 | 3.0 | 10.0 | 3.85 | 13.7 | wherein:
PS: Polymeric surfactant
MI: macroinitiator
MeOXA: 2-methyl-2-oxazoline
BN: phenyl cyanide In case PS2, 2.5 g of 2-undecyl-2-oxazoline were added after 48 hours of reaction and the temperature was increased to 130° C. and maintained for 24 hours.

Molecular weights were determined by any method known in the art such as Gel Permeation Chromatography.

Comparative Example
Elaboration of Water-based Adhesive for the Determination of Adhesive Strength A water-based adhesive was prepared, called adhesive 1, which was used as a comparative element. The adhesive 2 was similar to the adhesive 1 except that it contained the surfactant polymeric additive of the present invention. The percentage compositions in weight of the respective adhesives are shown next:

Adhesive 1

Percentage composition in weight: Aqueous dispersion of hydroxylated polyurethane (Dispercoll U53) 96%

Poly (isocyanate) ((Desmodur DA) 4%

The adhesive 1 is a commercial product.

Adhesive 2

Percentage composition in weight: Aqueous dispersion of hydroxylated polyurethane (Dispercoll U53) 96%

Poly (isocyanate) ((Desmodur DA) 4%

Polymeric additive (PS1) 1% with regard to the total mixture.

Dispercoll U53 and Desmodur DA product are commercial products of the Bayer AG Company.

Dispercoll U, is a tradename for Bayer AG Company, and includes a range of aqueous, colloidal dispersions of high molecular weight hydroxyl polyurethane polymers. Dispercoll U 53 is a linear aliphatic polyester urethane based on hexamethylene diisocyanate (HDI) and isophorone diisocyanate (IPDI) in aqueous dispersion with a mean particle size of 100 nm. This product, whose total weight % solids in aqueous dispersion is 40.+−.1, has a viscosity at 73. degree. F./23. degree. C. (cps/mpa) (Brookfield LVF, spindle 2, 30 rpm) of<600. The white liquid dispersion has a specific gravity of 1.2 g/cm.sup.3, and the polymer exhibits a high level of crystallization. The dispersion's specific gravity is 1.1, its pH is 7, and it carries an anionic particle charge. The manufacturers recommend that it be kept at a pH of 6–8 since acidic or highly alkaline conditions can cause a loss of properties due to hydrolytic degradation of the polymer.

Desmodur DA is a water-dispersible polyisocyanate preferably in the form of an aliphatic polyisocyanate.

Qualitative Determination of Adhesive Strength of the Water-based Adhesive on Different Substrates Test substrates:

a) reticulated copolymer of ethylene and vinyl acetate (EVA)
b) leather
c) sole
d) polyurethane All the substrates samples were 100 mm long, 25 mm wide, and 5 mm deep.

Procedure 1) the adhesive was applied on the surface to be glued by using a paintbrush and was left to dry for an hour at ambient temperature.
2) after the drying time, the adhesive contained on both surfaces was heat-activated at 80° C. for 10 minutes.

After activation, the activated surfaces were joined by means of a press using a 20Kp/cm² pressure for 1 minute.

The adhesive strength was qualitatively determined by hand separation of the adhered surfaces after 7 days drying time. It was impossible to quantitatively measure the adhesive strength because the breaking of the material occurs on attempting to detach it when the same contains the polymeric additive:

The table III shows the results obtained when different substrates were glued using water-based adhesive with and without polymeric additive:

TABLE III

Qualitative Determination of the Adhesive Strength

| Substrate | With Polymeric additive* (Adhesive 2) | Without Polymeric additive (Adhesive 1) |
|---|---|---|
| EVA-EVA (White) | Complete tearing | No tear |
| EVA-EVA (Carbon Black) | Very good tear | No tear |

TABLE III-continued

Qualitative Determination of the Adhesive Strength

| Substrate | With Polymeric additive* (Adhesive 2) | Without Polymeric additive (Adhesive 1) |
|---|---|---|
| Leather-Sole | Very good tear | Slight tear |
| Leather-Polyurethane | Very good tear | Slight tear |

In table III, PS1 was the polymeric additive used.

The term "tear" in the above table qualitatively means that the material tears or breaks easily on attempting to separate the glued surfaces, which indicated that the adhesive strength was equal or higher than the cohesive strength of the material itself.

From Table III, it was deduced that the addition of the polymeric surfactant (PS1) to the water-based adhesive increased the adhesive strength of the latter considerably. Similar results were obtained with the PS2 polymeric surfactant.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

What we claim is:

1. An adhesion promoter for a water-based based adhesive, said adhesion promoter having the general formula:

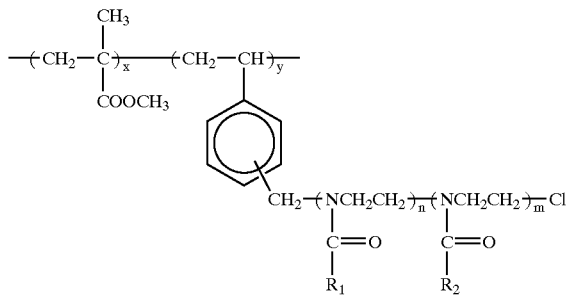

where:
x = 1–10
y = 1–10
n = 10–100
m = 0–50
R1 = methyl, ethyl
R2 = octyl, nonyl, decyl, undecyl.

2. The adhesion promoter according to claim 1, wherein the adhesion promoter includes a main chain and at least one side chain, wherein the main chain is hydrophobic and at least one side chain is hydrophilic.

3. The adhesion promoter according to claim 2, wherein at least one side chain is at least one of poly (2-methyl-2-oxazoline) and poly (2-undecyl-2-oxazoline).

4. A method of preparing an adhesion promoter having the general formula:

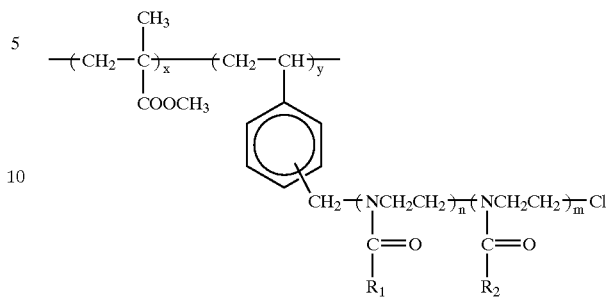

Where:
x = 1–10
y = 1–10
n = 10–100
m = 0–50
R1 = methyl, ethyl
R2 = octyl, nonyl, decyl, undecyl the method comprising the steps of:
a) preparing a macroinitiator; and
b) grafting a 2-substitute-2-oxazoline in the presence of phenyl cyanide with the macroinitiator to produce a mixture, followed by heating the mixture between 70 to 150° C. under nitrogen atmosphere, and precipitating the mixture in diethylether to form the polymeric surfactant;

wherein the macroinitiator is prepared by a free-radical polymerization in bulk between a chloromethylstyrene and methyl methacrylate between 20 to 100° C. under nitrogen atmosphere.

5. A method according to claim 4, wherein the 2-substitute-2-oxazoline is at least one of 2-methyl-2-oxazoline or 2-ethyl-2-oxazoline.

6. A method according to claim 4, wherein the free radical initiator is selected from the group consisting of benzoyl peroxide, di-tertiarybutyl peroxide, di-cumylperoxide, tertiaryamyl peroxide, cumenehydroperoxide, di(n-propyl) peroxydicarbonate, and 2,2 azobisisobutyronitrile.

7. A method according to claim 4, wherein the free radical initiator is benzoyl peroxide.

8. A method according to claim 4, wherein the temperature of step a) is 80° C., and the temperature of step b) is 110° C.

9. The adhesion promoter according to claim 1, further including potassium iodide as catalizer, wherein the potassium iodide increases the polymerization reaction rate.

10. The adhesion promoter according to claim 1, wherein the adhesion promoter is part of a water based adhesive.

* * * * *